United States Patent [19]

Flotow

[11] Patent Number: 4,903,806
[45] Date of Patent: Feb. 27, 1990

[54] HYDRAULICALLY ACTUATED RELEASE MECHANISM FOR A CLUTCH

[75] Inventor: Richard A. Flotow, Butler, Ind.

[73] Assignee: Dana Corporation, Toledo, Ohio

[21] Appl. No.: 190,859

[22] Filed: May 6, 1988

[51] Int. Cl.⁴ ............................................. F16D 25/08
[52] U.S. Cl. ............................ 192/85 CA; 192/91 A; 192/98
[58] Field of Search ................ 192/85 CA, 91 A, 98, 192/99 A

[56] References Cited

U.S. PATENT DOCUMENTS

| | | |
|---|---|---|
| 2,135,617 | 11/1938 | Geyer . |
| 2,564,281 | 8/1951 | Rockwell . |
| 2,668,610 | 2/1954 | Backus . |
| 2,717,680 | 9/1955 | Smith . |
| 2,757,769 | 8/1956 | Roise . |
| 2,864,480 | 12/1958 | Sink . |
| 3,131,796 | 5/1964 | Youngs, III . |
| 3,239,045 | 3/1966 | Schubert . |
| 3,474,888 | 10/1969 | Carlson et al. . |
| 3,672,478 | 6/1972 | Riese et al. ........................... 192/86 |
| 3,760,916 | 9/1973 | Hanks et al. ....................... 192/67 R |
| 3,907,085 | 9/1975 | Rist .................................. 192/85 AA |
| 3,955,660 | 5/1976 | Poon et al. ......................... 192/91 A |
| 4,034,836 | 7/1977 | Sink et al. ........................... 192/99 A |
| 4,193,485 | 3/1980 | Johns et al. .................... 192/91 A X |
| 4,344,516 | 8/1982 | Kolb .................................. 192/114 R |
| 4,456,111 | 6/1984 | Limbacher ....................... 192/85 CA |
| 4,560,051 | 12/1985 | Brandenstein et al. ............... 192/98 |
| 4,561,531 | 12/1985 | Young et al. ................... 192/85 CA |
| 4,585,106 | 4/1986 | Shirley ............................ 192/85 CA |
| 4,585,107 | 4/1986 | Leigh-Monstevens ........ 192/85 CA |
| 4,585,108 | 4/1986 | Leigh-Monstevens ........ 192/85 CA |
| 4,585,109 | 4/1986 | Shirley et al. .................. 192/85 CA |
| 4,660,702 | 4/1987 | Flotow ...................... 192/85 CA X |
| 4,687,084 | 8/1987 | Leigh-Monstevens et al. ...... 192/85 CA |
| 4,733,763 | 3/1988 | Gay et al. ............................. 192/98 |

FOREIGN PATENT DOCUMENTS

| | | |
|---|---|---|
| 3414648 | 10/1985 | Fed. Rep. of Germany . |
| 765330 | 6/1934 | France ............................. 192/91 A |
| 1020098 | 2/1953 | France ............................. 192/91 A |
| 2517000 | 5/1983 | France . |
| 2116283 | 9/1983 | United Kingdom . |
| 2185083 | 7/1987 | United Kingdom . |
| 2195413 | 4/1988 | United Kingdom ................. 192/98 |

*Primary Examiner*—Rodney H. Bonck
*Attorney, Agent, or Firm*—MacMillan, Sobanski & Todd

[57] ABSTRACT

A release mechanism for a clutch having an axially movable release sleeve is disclosed. A pressure ring is mounted about the release sleeve by a bearing. When the pressure ring is moved toward a disengaged position, it moves the release sleeve in the same direction. A piston housing is mounted about an inner flange formed on a cover of the clutch by a bearing. The piston housing is disposed adjacent to the pressure ring and includes an annular groove formed therein which extends away from the pressure ring. An annular piston is disposed within the groove, defining a chamber within the piston housing. An external port provides communication between the chamber and a source of pressurized fluid for selectively moving the piston axially outwardly into engagement with the pressure ring. When so actuated, the pressure ring is moved axially outwardly, causing the release sleeve to be moved to the disengaged position. A hollow pressure ring cover is attached about the pressure ring having circumferential flat portions formed thereon. One of the flat portions abuts the adjacent axially extending leg of an L-shaped bracket, which is secured to the housing of a transmission or other non-rotating member, so as to prevent rotation of the pressure ring and the piston housing.

28 Claims, 1 Drawing Sheet

HYDRAULICALLY ACTUATED RELEASE MECHANISM FOR A CLUTCH

BACKGROUND OF THE INVENTION

The present invention relates in general to clutches and in particular to an internal hydraulically actuated release mechanism adapted for use in a pull-to-release type clutch.

Clutches are well known devices which are adapted to selectively connect a driving input member to a driven output member, typically for rotation together in a vehicle. Within such clutches, a plurality of springs is frequently used to urge the components of clutch toward an engaged position, wherein the input member frictionally engages the driven output member. The force generated by these springs is generally large in magnitude so as to insure a reliable frictional engagement between the input and output members when engaged.

A releasing assembly is provided in clutches of this type to selectively move the components thereof from the engaged position to a disengaged position, wherein the input member does not frictionally engage the output member. The releasing assembly typically includes a release sleeve having a first end connected to some of the components of the clutch and a second end which extends outwardly from the clutch housing. The release sleeve is adapted to be moved axially between engaged and disengaged positions so as to move the components of the clutch accordingly.

Since the release sleeve usually rotates with the components of the clutch to which it is connected, the second end thereof generally has an annular release bearing disposed thereabout. The release bearing is attached to the release sleeve so as to prevent relative axial movement therebetween. The release bearing is provided so that the outer race thereof may be engaged by a non-rotating actuating mechanism. The actuating mechanism may be a mechanical linkage or a hydraulically actuated piston for axially moving the release bearing and the release sleeve between the engaged and disengaged positions.

SUMMARY OF THE INVENTION

The present invention relates to an improved structure for an internal hydraulically actuated release mechanism adapted for use in a pull-to-release type clutch. The clutch includes a release sleeve which is axially movable between engaged and disengaged positions to operate the clutch accordingly. A generally annular pressure ring is mounted about the release sleeve by means of an annular bearing, which permits the release sleeve to rotate relative to the pressure ring. When the pressure ring is moved toward the disengaged position, it moves the release sleeve in the same direction. A generally annular piston housing is mounted about an inner flange formed on a cover of the clutch by means of an annular bearing. The piston housing is disposed adjacent to the pressure ring and includes an annular groove formed therein which extends axially inwardly away from the pressure ring. An annular piston is disposed within the groove, thereby defining a chamber within the piston housing. An external port provides communication between the chamber and a source of pressurized fluid for selectively moving the piston axially outwardly into engagement with the pressure ring. When so actuated, the pressure ring is moved axially outwardly, causing the release sleeve to be moved to the disengaged position. A hollow pressure ring cover is attached about the pressure ring having one or more circumferential flat portions formed thereon. One of the flat portions abuts the adjacent axially extending leg of an L-shaped bracket, which is secured to the housing of a transmission or other non-rotating member, so as to prevent rotation of the pressure ring and the piston housing.

It is an object of the present invention to provide an improved internal hydraulically actuated release mechanism adapted for use in pull-to-release type clutches.

It is another object of the present invention to provide such a release mechanism wherein none of the components thereof are mounted for rotation on a transmission housing, thereby making the clutch readily adaptable for use with transmission housings of differing sizes and shapes.

It is a further object of the present invention to provide such a release mechanism with means for preventing the components thereof from rotating with the components of the clutch.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
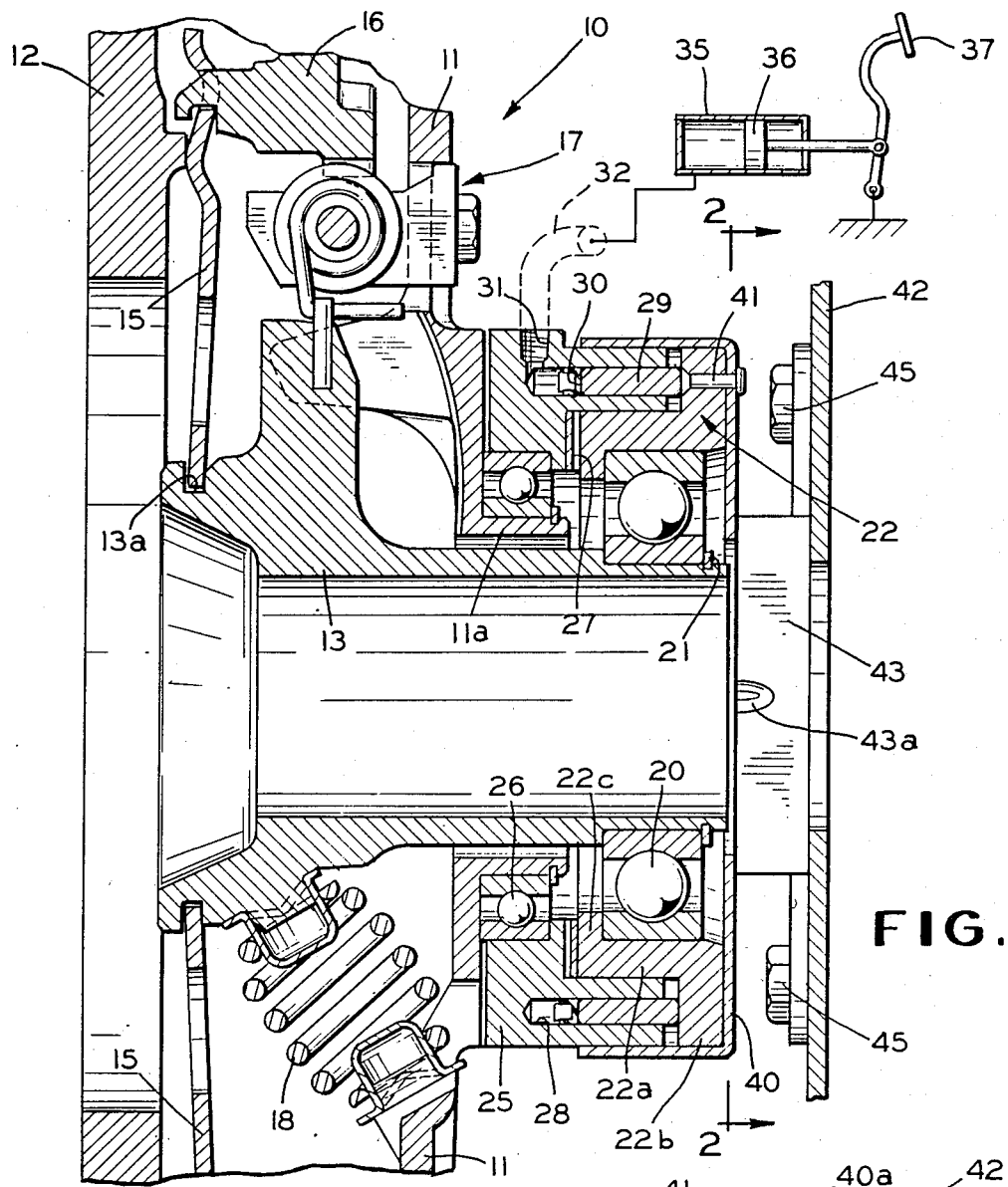
FIG. 1 is a sectional elevational view of a portion of a clutch having an internal hydraulically actuated release mechanism in accordance with the present invention.

Referring now to the drawings, there is illustrated in FIG. 1 a portion of a clutch, indicated generally at 10, in accordance with the present invention. The clutch 10 is a conventional pull-to-release type clutch, including an outer cover 11 and a pressure plate 12. The cover 11 is connected to a flywheel (not shown) for rotation therewith. The flywheel and the cover 11 constitute the input member to the clutch 10, and both rotate about a central axis. The pressure plate 12 is connected to the cover 11 by means of a conventional drive strap assembly (not shown) or other similar means. As is known in the art, the pressure plate 12 rotates with the cover 11, while being axially movable relative thereto. The manner in which such axial movement of the pressure plate 12 is accomplished is explained below.

The cover 11 extends radially inwardly, terminating in an axially outwardly extending (from left to right in FIG. 1) hollow cylindrical flange 11a which defines a central aperture. The aperture is co-axial with the axis of rotation mentioned above. A generally hollow cylindrical release sleeve 13 is disposed within the central aperture formed through the cover 11. The release sleeve 13 is mounted on an output shaft (not shown) of the clutch 10. The release sleeve 13 is axially movable along such output shaft, as is well known in the art.

A first end of the release sleeve 13 extends axially inwardly (from right to left in FIG. 1) within the clutch 10, having an annular outer groove 13a formed thereabout. The groove 13a is adapted to receive the radially innermost ends of a plurality of levers 15. The radially outermost ends of the levers 15 are received in corresponding slots formed in an automatic adjusting ring 16. The adjusting ring 16 is threaded into the cover 11 in a manner which is well known in the art. An automatic wear compensator, indicated generally at 17, is connected between the adjusting ring 16 and the first end of the release sleeve 13 to rotate the adjusting ring 16 relative to the cover 11 as wear occurs within the clutch 10. The structure and operation of the adjusting ring 16 and the automatic wear compensator 17 are disclosed in U.S. Pat. No. 3,752,286 to Sink, owned by the assignee of the present invention. The disclosure of such patent is incorporated herein by reference. Alternatively, a conventional manual adjusting ring (not shown) may be used instead of the automatic adjusting ring 16 and the automatic wear compensator 17.

As is well known in the art, a plurality of springs 18 (only one is illustrated) extends between the cover 11 and the first end of the release sleeve 3. The springs 18 urge the release sleeve 13 axially inwardly toward an engaged position, wherein the components of the clutch 10 are frictionally engaged so as to connect the flywheel to the output shaft for rotation together. When moved toward such engaged position, the release sleeve 13 moves the radially innermost ends of the levers 15 axially inwardly. The pressure plate 12 is engaged by such levers 15 between the radially innermost and outermost ends thereof. Thus, when the release sleeve 13 is moved axially inwardly, the pressure plate 12 is also moved in that direction toward an engaged position. Conversely, when the release sleeve 13 is moved axially outwardly toward a disengaged position, the release sleeve 13 moves the radially innermost ends of the levers 15 in the opposite direction. The pressure plate 12 is also moved axially outwardly toward a disengaged position by virtue of the drive strap mechanism, causing the output shaft of the clutch 10 to be disengaged from the flywheel.

A second end of the release sleeve 13 extends axially outwardly from the cover 11 of the clutch 10. An annular release bearing 20 is disposed about the second end of the release sleeve 13 and is retained thereon between a shoulder formed integrally with the release sleeve 13 and a snap ring 21 or similar means. Thus, relative axial movement between the release bearing 20 and the release sleeve 13 is prevented. A pressure ring, indicated generally at 22, is disposed about the release bearing 20 and the second end of the release sleeve 13. The pressure ring 22 includes a central axially extending portion 22a which extends circumferentially about the release bearing 20. The pressure ring 22 further includes a radially outwardly extending portion 22b, which extends from the axially outer end of the central portion 22a, and a radially inwardly extending portion 22c, which extends from the axially inwardly end of the central portion 22a.

The radially inwardly extending portion 22c of the pressure ring 22 extends between the axially inwardly facing surface of the release bearing 20 and the axially outwardly facing surface of the cover 11. Thus, when the release sleeve 13 and the release bearing 20 are moved axially inwardly toward the engaged position by the springs 18, the pressure ring 22 is moved axially inwardly therewith. Similarly, as will be explained in greater detail below, when the pressure ring 22 is moved axially outwardly toward the disengaged position, the release bearing 20 and the release sleeve 13 are moved axially therewith. The release bearing 20 permits the pressure ring 22 to be maintained in non-rotating relationship about the rotatable release sleeve 13.

A generally annular piston housing 25 is mounted about the flange 11a by an annular bearing 26. Thus, similar to the pressure ring 22, the bearing 26 permits the piston housing 25 to be maintained in non-rotating relationship about the rotatable cover 11. The piston housing 25 is disposed axially between the cover 11 and the pressure ring 22. Between a radially innermost portion of the piston housing 25 and the radially inwardly extending portion 22c of the pressure ring 22, an annular wave washer 27 is disposed. The purpose of the wave washer 27 will be described in detail below.

A relatively deep annular groove 28 is formed in the piston housing 25. The groove 28 extends axially inwardly away from the pressure ring 22. An annular piston 29 is disposed within the groove 28. The axial length of the piston 29 is less than the axial length of the groove 28. An annular seal 30 having a generally U-shaped cross section is disposed adjacent to the axially inner end of the piston 29. Thus, a relatively fluid-tight chamber is defined within the piston housing 25 by the groove 28 and the seal 30. An external port 31 is formed in the piston housing 25 which communicates with this chamber. The port 31 may be connected to a source of pressurized fluid by means of a hose, indicated in dotted lines at 32.

As schematically illustrated in FIG. 1, the source of pressurized fluid may consist of master hydraulic cylinder 35 having an internal piston 36 connected to a manually operable clutch pedal 37. As is well known in the art, a reservoir (not shown) is provided to supply hydraulic fluid to the working chamber of the cylinder 35. When the pedal 37 is depressed, such as by the foot of the operator when it is desired to disengage the clutch 10, the piston 36 is moved axially within the cylinder 35. As a result, hydraulic fluid in the working chamber of the cylinder 35 is compressed, causing fluid pressure to build in the hose 32 and in the chamber defined within the piston housing 25. When such fluid pressure exceeds a predetermined magnitude, the axially outward force generated within the chamber and exerted against the piston 29 becomes greater than the axially inward force exerted by the springs 20 against the release sleeve 13. Consequently, the release sleeve 13 is moved axially outwardly from the engaged position to the disengaged position. When the pedal 37 is released, the fluid pressure in the chamber decreases, allowing the urging of the springs 20 to move the release sleeve 13 axially inwardly to the engaged position. It will be appreciated that other means may be used to selectively create and maintain the fluid pressure in the chamber within the piston housing 25.

Figure 2:
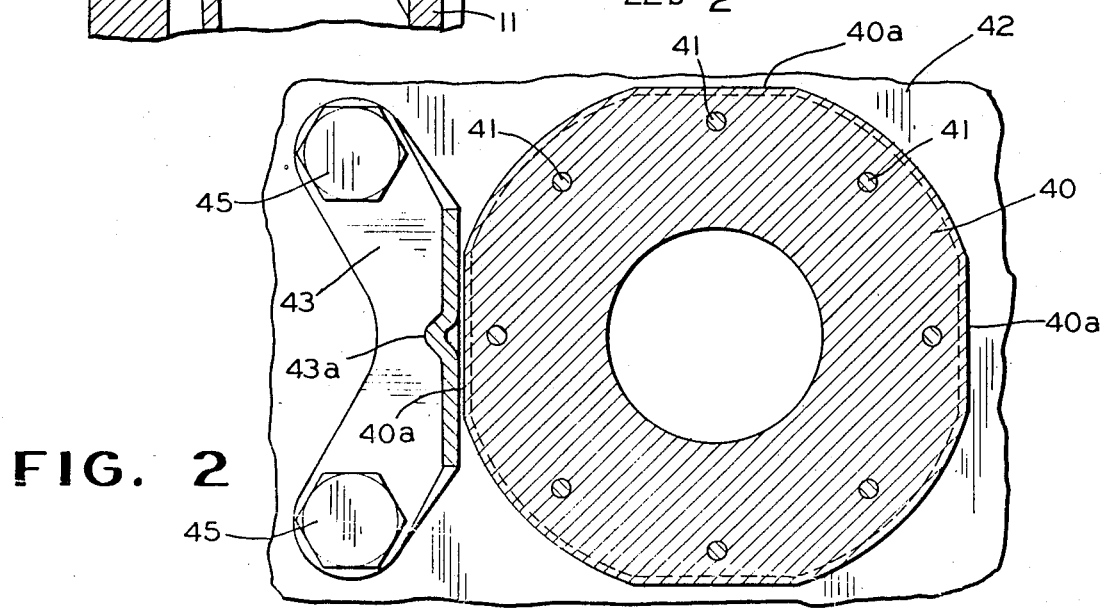
FIG. 2 is a sectional elevational view taken along line 2—2 of FIG. 1.

A pressure ring cover 40 is attached to the pressure ring 22 by a plurality of rivets 41. The pressure ring cover 40 is generally cup-shaped, having an axially extending portion and a radially oriented end surface. The axially extending portion of the pressure ring cover 40 is disposed circumferentially about the outer peripheral surfaces of the radially outwardly extending portion 22b of the pressure ring 22 and of the piston housing 25. The radially extending portion of the pressure ring cover 40 is disposed over the axially outer end surface of the pressure ring 22. As shown in FIG. 2, the outer periphery of the pressure ring cover 40 is formed having a plurality of flat portions 40a. The purpose of these flat portions 40a will be explained in detail below.

The end surface of the pressure ring cover 40 is disposed adjacent to the forward end of a housing 42 of a conventional transmission. As is conventional in the art, the output shaft from the clutch 10 extends into the transmission housing 42 and constitutes the input shaft thereto. One leg of an L-shaped bracket 43 is secured to the transmission housing 42 by a pair of threaded fasteners 45. A second leg of the bracket 43 extends axially adjacent to and in abutting relationship with one of the flat portions 40a of the pressure ring cover 40, as best shown in FIG. 2. A generally V-shaped rib 43a is formed in the second leg of the bracket 40 to stiffen such leg and reduce the amount of bending thereof, as will be explained below.

The clutch 10 is operated between its engaged and disengaged positions as described above. As mentioned above, the bearings 20 and 26 permit the release sleeve 13 and the cover 11, respectively, to rotate relative to the pressure ring 22 and the piston housing 25, which are both maintained in non-rotating relationship. However, because of friction within such bearings 20 and 26, there is a tendency for the pressure ring 22 and the piston housing 25 to rotate with the associated components of the clutch 10. Such rotation is undesirable because the hose 32, which is connected to the port 31, is moved therewith. Preventing such rotation permits a shorter length of hose 32 to be used than would otherwise be possible. Also, unnecessary flexing of the hose 32 is avoided.

In order to prevent this rotation from occurring, the flat portions 40a are provided on the pressure ring cover 40 to cooperate with the second leg of the bracket 43. If any such rotation is attempted, the second leg of the bracket 43 blocks such movement by abutting the flat portions 40s, as can be best seen in FIG. 2. Thus, the clutch 10 provides a means for preventing such rotation.

As discussed above, the wave washer 27 is disposed between a radially innermost portion of the piston housing 25 and the radially inwardly extending portion 22c of the pressure ring 22. The wave washer 27 is provided to maintain a relatively light axially outwardly directed force against the pressure ring 22. As a result, the pressure ring 22 is constantly urged against the release bearing 20 secured to the release sleeve 13. This light urging prevents the pressure ring 22 from rattling when the clutch 10 is in the disengaged position. This is particularly important as wear occurs within the clutch 10. Such wear occurs in relatively small increments over time, but the automatic wear compensator 17 is responsive only to larger amounts of wear. The wave washer 27 prevents rattling of the pressure ring 22 when the amount of wear which has occurred is less than the automatic wear compensator 17 can sense and correct.

From the above description of the clutch 10 of the present invention and the drawings, it can be seen that none of the components of the release mechanism are supported for rotation on the transmission housing 42. Thus, the clutch 10 is readily adaptable for use with transmission housings 42 of differing sizes and shapes, since there is no fixed connection therebetween. Furthermore, as shown in FIGS. 1 and 2, an axial space is defined between the release mechanism of the clutch 10 and the transmission housing 42. This axial space permits the use of a conventional clutch brake (not shown) on the output shaft, which would not be possible if the components of the release mechanism were supported for rotation on the transmission housing 42.

In use, so long as a portion of the bracket 43 is maintained axially along the flat portions 40a of the pressure ring cover 40, the relative axial positions of the bracket 43 and the cover 40 are not critical. This is because the L-shaped bracket 43 merely abuts the flat portions 40a and is not attached thereto. Accordingly, a single sized bracket 43 can be suited for use with transmission housings 42 of different sizes and shapes. Also, a plurality of apertures (not shown) may be provided in such bracket 43 so as to permit a single such bracket 43 to be used on transmission housings 42 having threaded apertures formed in different locations for the fasteners 45 than those illustrated.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A release mechanism for a clutch having a release sleeve which is moveable between first and second positions comprising:
    a piston housing disposed about the release sleeve, said piston housing defining a chamber therein;
    a piston disposed in said chamber;
    means for selectively providing fluid pressure in said chamber, said piston being moveable from a first position to a second position when fluid pressure is provided in said chamber;
    a pressure ring disposed about the release sleeve and moveable by said piston from a first position to a second position when fluid pressure is provided in said chamber, said pressure ring having a flat portion formed thereon and being adapted to move the release sleeve from its first position to its second position when moved by said piston; and
    means cooperating with said flat portion for preventing rotation of said pressure ring.

2. The invention defined in claim 1 wherein said means for preventing rotation includes a bracket secured to a transmission housing and extending into abutting relationship with said flat portion of said pressure ring.

3. The invention defined in claim 2 wherein said bracket is generally L-shaped, having a first leg connected to said transmission housing and a second leg extending axially adjacent to and into abutting relationship with said flat portion of said pressure ring.

4. The invention defined in claim 3 wherein said second leg of said bracket has a generally V-shaped strengthening rib formed therein.

5. The invention defined in claim 1 further including a pressure ring cover attached to said pressure ring.

6. The invention defined in claim 5 wherein said pressure ring cover is generally cup-shaped, having an axially extending portion disposed about an outer peripheral surface of said pressure ring and a radially oriented end surface disposed over an axially outer end surface of said pressure ring.

7. The invention defined in claim 6 wherein an outer periphery of said pressure ring cover is formed having at least one flat portion located adjacent to said flat portion of said pressure ring.

8. The invention defined in claim 7 wherein said means for preventing rotation includes a bracket secured to a transmission housing and extending into abutting relationship with said flat portion of said pressure ring cover.

9. The invention defined in claim 8 wherein said bracket is generally L-shaped, having a first leg connected to said transmission housing and a second leg extending axially adjacent to and into abutting relationship with said flat portion of said pressure ring cover.

10. The invention defined in claim 9 wherein said second leg of said bracket has a generally V-shaped strengthening rib formed therein.

11. The invention defined in claim 1 wherein said piston housing is mounted on a flange formed on a cover for the clutch such that said cover may be rotated relative to said piston housing.

12. The invention defined in claim 11 further including bearing means disposed between said flange and said piston housing to permit said cover to rotate relative to said piston housing.

13. The invention defined in claim 11 further including bearing means disposed between the release sleeve and said pressure ring to permit the release sleeve to rotate relative to said pressure ring.

14. The invention defined in claim 11 further including first bearing means disposed between said flange and said piston housing to permit said cover to rotate relative to said piston housing and second bearing means disposed between the release sleeve and said pressure ring to permit the release sleeve to rotate relative to said pressure ring, whereby said cover and the release sleeve are permitted to rotate during use relative to said piston housing and said pressure ring.

15. A release mechanism for a clutch having a release sleeve which is movable between first and second positions comprising:
 a cover having a flange formed thereon;
 a piston housing disposed about the release sleeve and mounted on said flange such that said cover may be rotated relative thereto, said piston housing defining a chamber therein;
 a piston disposed in said chamber;
 means for selectively providing fluid pressure in said chamber, said piston being moveable from a first position to a second position when fluid pressure is provided in said chamber; and
 a pressure ring engaged and moved by said piston from a first position to a second position when fluid pressure is provided in said chamber, said pressure ring adapted to move the release sleeve from its first position to its second position when moved by said piston.

16. The invention defined in claim 15 further including bearing means disposed between said flange and said piston housing to permit said cover to rotate relative to said piston housing.

17. The invention defined in claim 15 wherein said pressure ring is disposed about the release sleeve and further including bearing means disposed between the release sleeve and said pressure ring to permit the release sleeve to rotate relative to said pressure ring.

18. The invention defined in claim 15 wherein said pressure ring is disposed about the release sleeve and further including first bearing means disposed between said flange and said piston housing to permit said cover to rotate relative to said piston housing and second bearing means disposed between the release sleeve and said pressure ring to permit the release sleeve to rotate relative to said pressure ring, whereby said cover and the release sleeve are permitted to rotate during use relative to said piston housing and said pressure ring.

19. The invention defined in claim 15 wherein said pressure ring has a flat portion formed thereon and further including means cooperating with said flat portion for preventing rotation of said pressure ring.

20. The invention defined in claim 19 wherein said means for preventing rotation includes a bracket secured to a transmission housing and extending into abutting relationship with said flat portion of said pressure ring.

21. The invention defined in claim 20 wherein said bracket is generally L-shaped, having a first leg connected to said transmission housing and a second leg extending axially adjacent to and into abutting relationship with said flat portion of said pressure ring.

22. The invention defined in claim 21 wherein said second leg of said bracket has a generally V-shaped strengthening rib formed therein.

23. The invention defined in claim 21 further including a pressure ring cover attached to said pressure ring.

24. The invention defined in claim 23 wherein said pressure ring cover is generally cup-shaped, having an axially extending portion disposed about an outer peripheral surface of said pressure ring and a radially oriented end surface disposed over an axially outer end surface of said pressure ring.

25. The invention defined in claim 24 wherein an outer periphery of said pressure ring cover is formed having at least one flat portion located adjacent to said flat portion of said pressure ring.

26. The invention defined in claim 25 wherein said means for preventing rotation includes a bracket secured to a transmission housing and extending into abutting relationship with said flat portion of said pressure ring cover.

27. The invention defined in claim 26 wherein said bracket is generally L-shaped, having a first leg connected to said transmission housing and a second leg extending axially adjacent to and into abutting relationship with said flat portion of said pressure ring cover.

28. The invention defined in claim 27 wherein said second leg of said bracket has a generally V-shaped strengthening rib formed therein.

* * * * *